(12) United States Patent
Sun (10) Patent No.: US 12,160,129 B2
(45) Date of Patent: Dec. 3, 2024

(54) CHARGING CONTROL METHOD, CHARGING CONTROL DEVICE AND STORAGE MEDIUM

(71) Applicant: BEIJING XIAOMI MOBILE SOFTWARE CO., LTD., Beijing (CN)

(72) Inventor: Changyu Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 394 days.

(21) Appl. No.: 17/240,681

(22) Filed: Apr. 26, 2021

(65) Prior Publication Data
US 2022/0045535 A1 Feb. 10, 2022

(30) Foreign Application Priority Data
Aug. 7, 2020 (CN) .......................... 202010791337.4

(51) Int. Cl.
H02J 7/00 (2006.01)

(52) U.S. Cl.
CPC ........ *H02J 7/00714* (2020.01); *H02J 7/0047* (2013.01)

(58) Field of Classification Search
CPC .................................................... H02J 7/007
See application file for complete search history.

(56) References Cited

U.S. PATENT DOCUMENTS

| | | | |
|---|---|---|---|
| 2011/0037438 A1* | 2/2011 | Bhardwaj | H02J 7/0071 320/152 |
| 2011/0199055 A1* | 8/2011 | Burchardt | H01M 10/44 320/148 |
| 2019/0031035 A1 | 1/2019 | Koch | |
| 2021/0296921 A1 | 9/2021 | Lu et al. | |
| 2022/0123574 A1* | 4/2022 | Ioffe | H02J 7/00712 |

FOREIGN PATENT DOCUMENTS

| | | |
|---|---|---|
| CN | 107458230 A | 12/2017 |
| CN | 105471045 B | 4/2018 |
| WO | 2020119216 A1 | 6/2020 |

OTHER PUBLICATIONS

Supplementary European Search Report in the European application No. 21170421.8, mailed on Oct. 8, 2021.

* cited by examiner

*Primary Examiner* — Drew A Dunn
*Assistant Examiner* — Tynese V McDaniel
(74) *Attorney, Agent, or Firm* — Arch & Lake LLP (57) ABSTRACT

A charging control method includes that: for each charging stage among the multiple charging stages, a current rate of change threshold corresponding to a present charging stage is determined; a polling duration and current adjustment step corresponding to the present charging stage are determined, a ratio of the current adjustment step to the polling duration being greater than the current rate of change threshold; and in the present charging stage, a charging current value is detected according to the polling duration, and in response to determining the charging current value is greater than a specified current threshold, a current is adjusted according to the current adjustment step.

9 Claims, 8 Drawing Sheets

S11 — For each of multiple charging stages, a current rate of change threshold corresponding to a present charging stage is determined S12 — A polling duration and current adjustment step corresponding to the present charging stage are determined, a ratio of the current adjustment step to the polling duration being greater than the current rate of change threshold S13 — In the present charging stage, a charging current value is detected according to the polling duration, and if the charging current value is greater than a specified current threshold, a current is adjusted according to the current adjustment step

CHARGING CONTROL METHOD, CHARGING CONTROL DEVICE AND STORAGE MEDIUM

CROSS-REFERENCE TO RELATED APPLICATION

This application claims the priority to Chinese Patent Application No. 202010791337.4, filed on Aug. 7, 2020, the content of which is incorporated herein by reference in its entirety for all purposes.

TECHNICAL FIELD

The present disclosure generally relates to the field of charging technologies, and more particularly, to a charging control method, a charging control device and a storage medium.

BACKGROUND

With the perfection of functions of mobile terminals, mobile terminals have been applied to more and more application scenarios. For meeting an operating requirement of a user and improving standby time and charging speed of a mobile terminal, a high-power fast charging technology is usually adopted to charge the mobile terminal. A high-power fast charging process includes multiple charging stages, and when each charging stage is switched, a Constant Voltage (CV) mode may be adopted to adjust a current change.

A charge pump is usually adopted for high-power fast charging, but the charge pump cannot control a charging output voltage and current, so that a Software Constant Voltage (SCV) charging control method is required for adjusting the charging output voltage and current. In a related art, a current change is adjusted through the following solution: a charging current is polled at a fixed time interval, if the charging current is greater than a specified threshold, a current level is adjusted according to a fixed step, or if a charging voltage reaches a specified voltage threshold, a voltage level is adjusted according to a fixed step.

However, during high-power fast charging, since each charging stage is switched at a relatively high speed, when the charging stages are switched according to fixed pooling time and a fixed step, the switching speed is relatively low, and consequently, in some charging stages, the charging voltage is ultra-high, and thus a requirement of controlling the voltage accurately in the high-power charging technology cannot be met.

SUMMARY

For solving the problem in the related art, the present disclosure provides a charging control method, a charging control device and a storage medium.

In a first aspect of the present disclosure, a charging control method is provided, which is applied to a battery charging process including multiple charging stages, the charging control method includes that: for each charging stage among the multiple charging stages, a current rate of change threshold corresponding to a present charging stage is determined; a polling duration and current adjustment step corresponding to the present charging stage are determined, a ratio of the current adjustment step to the polling duration is greater than the current rate of change threshold; and in the present charging stage, a charging current value is detected according to the polling duration, and in response to determining the charging current value is greater than a specified current threshold, a current is adjusted according to the current adjustment step.

In a second aspect of the present disclosure, a charging control device is provided, which includes: a processor; and a memory configured to store instructions executable by the processor, where the processor is configured to for each charging stage among a plurality of charging stages, determine a current rate of change threshold corresponding to a present charging stage, wherein the plurality of charging stages is comprised in a battery charging process; determine a polling duration and a current adjustment step corresponding to the present charging stage, wherein a ratio of the current adjustment step to the polling duration is greater than the current rate of change threshold; and in the present charging stage, detect a charging current value according to the polling duration, and in response to determining the charging current value is greater than a specified current threshold, adjust a current according to the current adjustment step.

In a third aspect of the present disclosure, a non-transitory computer-readable storage medium is provided, instructions in the storage medium, when executed by a processor of a mobile terminal, causing the mobile terminal to perform operations including: for each charging stage among a plurality of charging stages, determining a current rate of change threshold corresponding to a present charging stage, wherein the plurality of charging stages is comprised in a battery charging process; determining a polling duration and a current adjustment step corresponding to the present charging stage, wherein a ratio of the current adjustment step to the polling duration is greater than the current rate of change threshold; and in the present charging stage, detecting a charging current value according to the polling duration, and in response to determining the charging current value is greater than a specified current threshold, adjusting a current according to the current adjustment step.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

With the extension of application scenarios of mobile terminals, requirements of users on both charging speeds and standby time of mobile terminals have increased, and for meeting the requirements of the users, more and more terminal device manufacturers have started providing mobile terminals adapted to fast charging technologies. For adaptation to a fast charging technology, a dual-cell battery may be adopted, namely two batteries are combined in series, so that charging power may be increased.

In the technical field of battery charging, when charging power is relatively low, for example, in a trickle charging stage and a charging ending stage, a charging current is usually lower than 2 A, and a Power Management Integrated Circuit (PMIC) is adopted for charging management. The PMIC has a power management function and may control a charging output voltage and current and adjust a voltage and current in a charging process. When the charging power is relatively high, a charge pump is usually adopted. The charging pump may generate an output voltage higher than an input voltage. For example, when the charge pump adopts a 2:1 charger for charging, an output voltage twice as large as an input voltage may be generated. The charge pump is high in charging efficiency and applicable to high-power charging.

A high-power charging process includes multiple charging stages (i.e., step charge). When each charging stage for step charge is switched, a CV reduction method is adopted to achieve a best effect. Since a 2:1 charger incapable of controlling a charging output voltage and current works in this process, a controller is required for adjustment. In the related art, in each charging stage, a control loop is polled through control software to implement a CV mode through a 2:1 circuit, and polling is implemented through an Application Processor (AP) or an independent Micro Controller Unit (MCU) and a charging adapter. By polling, when a detected charging voltage reaches a threshold, a current or a voltage is reduced according to a fixed level number to ensure that the detected charging voltage may be approximate to but not over the threshold of the charging voltage, so that charging power may be increased as much as possible in a range that a battery can withstand to improve the charging efficiency. It can be noted that a new charging stage is reached every time when the current or the voltage is reduced. When each charging stage is switched, an adjustment and control mode is the CV mode or a Constant Current (CC) mode. If the CC mode is adopted, when the detected voltage reaches the threshold, the current may be reduced according to a fixed level number, for example, reduced by 50 mA. If the CV mode is adopted, when the detected voltage value reaches the threshold, the voltage may be reduced according to the fixed level number, for example, reduced by 20 mV.

The charge pump applied to high-power charging does not have a function of controlling the charging output voltage and current and thus is required to be matched with the MCU and the charging adapter to poll the control loop through the control software to implement a CC-mode-based or CV-mode-based adjustment manner. In the related art, the CV-mode-based adjustment manner is usually adopted. That is, when the detected voltage value reaches the threshold, the current may be reduced by a level according to the fixed level number. By such repeated comparison, the detected voltage value is approximate to but not over the threshold of the charging voltage. This method is an SCV method.

In a charging process of a single-cell battery, a fixed polling duration and a fixed current adjustment step (also called a level number sometimes) are usually adopted. That is, polling is performed at a fixed time interval, and when a detected voltage reaches a threshold, the voltage is reduced by a fixed step of 1 to 2 levels every time to implement SCV charging control. In the charging process of the single-cell battery, the fixed polling duration is usually 200 mS, and the fixed step is usually 50 mA.

However, in a high-power charging process, for example, in a charging process of a dual-cell battery, a switching speed of each charging stage, i.e., a change rate of a step relative to a time length in a switching process of each charging stage, is relatively high, for example, twice a change rate during switching of the corresponding charging stage in the charging process of the single-cell battery. In such case, if the fixed time length and fixed step-based adjustment manner is still adopted, changes of different charging stages in the high-power charging process cannot be adjusted accurately, resulting in the phenomenon that the charging voltage in the charging process is ultra-high.

For the abovementioned technical solution, the present disclosure provides a charging control method, specifically an SCV charging control method. Switching of each charging stage may be adjusted accurately in a high-power charging process of a battery, and the problem that a charging voltage in the high-power charging process is ultra-high may be solved.

The charging control method of the present disclosure may be applied to high-power charging of a battery of a terminal device, for example, charging of a dual-cell battery. In the present disclosure, the terminal device may be a mobile phone, a tablet computer, a notebook computer, a wearable device, a personal digital assistant and the like. A specific type of the terminal device is not limited in the present disclosure.

In the present disclosure, in the high-power charging process of the battery, for keeping CV charging of the battery, a CV-mode-based adjustment manner is adopted to adjust a charging current, namely the current is adjusted when a detected voltage value reaches a threshold. By such repeated comparison, the detected voltage value is approximate to but not over the threshold of the charging voltage. By such an SCV method, the charging process of the battery includes multiple charging stages, charging currents in the different charging stages are different. And time lengths for switching between the charging stages and change steps of the charging currents are different, namely current change rates for switching between the charging stages are different.

Figure 1:
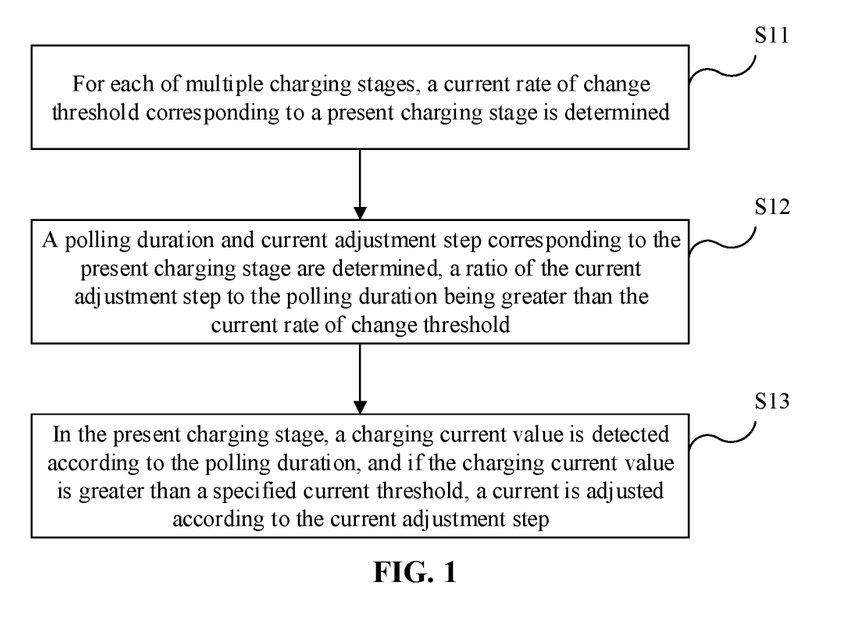
FIG. 1 is a flowchart of a charging control method according to an example of the present disclosure.

FIG. 1 is a flowchart of a charging control method according to an example of the present disclosure. Referring to FIG. 1, the charging control method is applied to a battery charging process. The battery charging process includes multiple charging stages. The charging control method of the present disclosure includes operations illustrated in blocks S11 to S13.

In S11, for each charging stage among the multiple charging stages, a current rate of change threshold corresponding to a present charging stage is determined.

In the example of the present disclosure, for the same battery, in multiple charging stages in a charging process of the battery, there is a respective current rate of change threshold for a current change rate of each charging stage in a switching process, namely a current change rate of each charging stage in the switching process may not exceed the current rate of change threshold. In the present disclosure, the current rate of change threshold corresponding to the present charging stage is determined in S11 at first.

In S12, a polling duration and current adjustment step corresponding to the present charging stage are determined, a ratio of the current adjustment step to the polling duration being greater than the current rate of change threshold.

In the example of the present disclosure, it may be configured that a charge pump is adopted for high-power charging of the battery. For example, a charge pump adopting a 2:1 charger configuration may be adopted for charging, and is applicable to charging of a dual-cell battery. The charge pump does not have a function of controlling a charging output voltage and current and thus is required to be matched with control software such as a controller to adjust the output voltage and current and poll a control loop. The control loop is polled through the control software. When a detected voltage value reaches a threshold, a current is reduced. In such case, elapsed time is the polling duration, and a corresponding current reduction is the current adjustment step. In the present disclosure, since the ratio of the current adjustment step to the polling duration is set to be greater than the current rate of change threshold, when the battery is charged by the charging control method of the present disclosure, a current rate of change in a switching process of each charging process exceeds the current rate of change threshold, and furthermore, a charging voltage in each charging stage in the charging process may be kept not over a voltage threshold corresponding to the charging stage.

In S13, in the present charging stage, a charging current value is detected according to the polling duration, and if the charging current value is greater than a specified current threshold, a current is adjusted according to the current adjustment step.

In the example of the present disclosure, the current rate of change threshold, the polling duration and the current adjustment step may be determined for each charging stage among the multiple charging stages, and the ratio of the current adjustment step to the polling duration is set to be greater than the current rate of change threshold. In the present disclosure, the charging current is detected at an interval of the polling duration, and when the charging current is detected to be greater than the specified current threshold, the current is adjusted according to the corresponding current adjustment step. By such a setting, the current change may be adjusted accurately in the high-power charging process of the battery, a charging overvoltage may be avoided (the charging voltage is kept not over the voltage threshold corresponding to the charging stage), and a purpose of CV charging may be achieved.

The technical solutions provided in the examples of the present disclosure may have the following beneficial effects. According to the charging control method of the present disclosure, the current rate of change threshold, polling duration and current adjustment step corresponding to the present charging stage are determined, and the current of the present charging stage is adjusted to keep the ratio of the current adjustment step to the polling duration greater than the current rate of change threshold. By such a configuration, the charging current may be controlled accurately in a high-power charging process, thereby avoiding an overvoltage for battery charging in a switching process of each charging stage.

Figure 2:
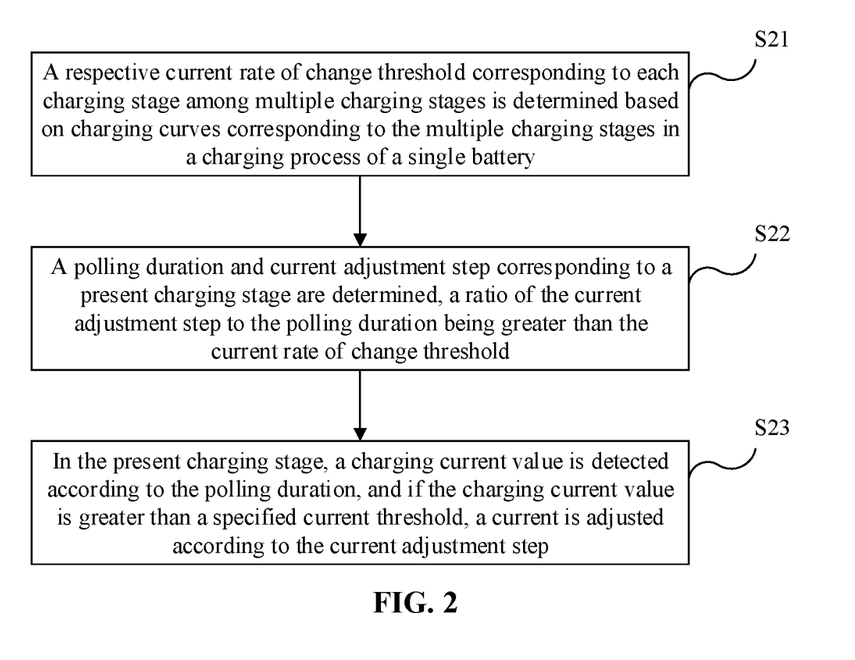
FIG. 2 is a flowchart of a charging control method according to an example of the present disclosure.

FIG. 2 is a flowchart of a charging control method according to another example of the present disclosure. Referring to FIG. 2, the charging control method of the present disclosure includes the following steps.

In S21, a respective current rate of change threshold corresponding to each charging stage among multiple charging stages is determined based on charging curves corresponding to the multiple charging stages in a charging process of a single battery.

In the example of the present disclosure, for the same battery, a charging process of the battery includes multiple charging stages, charging currents in different charging stages are different, and charging durations of different charging stages are also different. The charging currents, charging voltages and charging durations of the same battery in the charging process may be recorded, and an image may be drawn as a complete charging curve of the battery.

Figure 3:
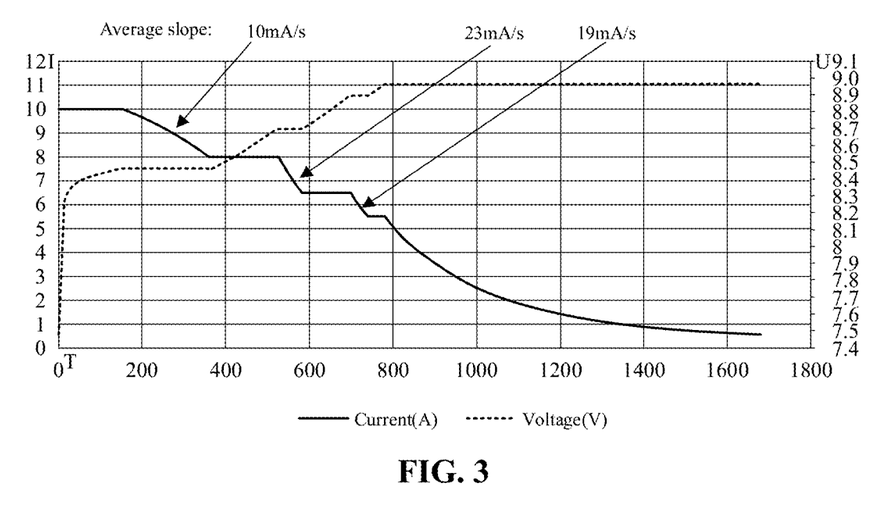
FIG. 3 is a diagram of a complete charging curve of a battery according to an example of the present disclosure.

FIG. 3 is a diagram of a complete charging curve of a battery according to an example of the present disclosure. Referring to FIG. 3, the x axis represents the charging time T, the y axis on the left side represents the charging current I, and the y axis on the right side represents the charging voltage U. A respective charging curve corresponding to each charging stage, for example, a current slash change region in the FIG. 3 may be calculated according to the complete charging curve. For each charging stage, a slope function K for the charging stage may be calculated by polynomial fitting or exponential fitting, K being the current rate of change threshold corresponding to the charging stage.

In S22, a polling duration and current adjustment step corresponding to a present charging stage are determined, a ratio of the current adjustment step to the polling duration being greater than the current rate of change threshold.

In S23, in the present charging stage, a charging current value is detected according to the polling duration, and if the charging current value is greater than a specified current threshold, a current is adjusted according to the current adjustment step.

In the example of the present disclosure, an implementation process of determining the current rate of change threshold will be described below.

Figure 4:
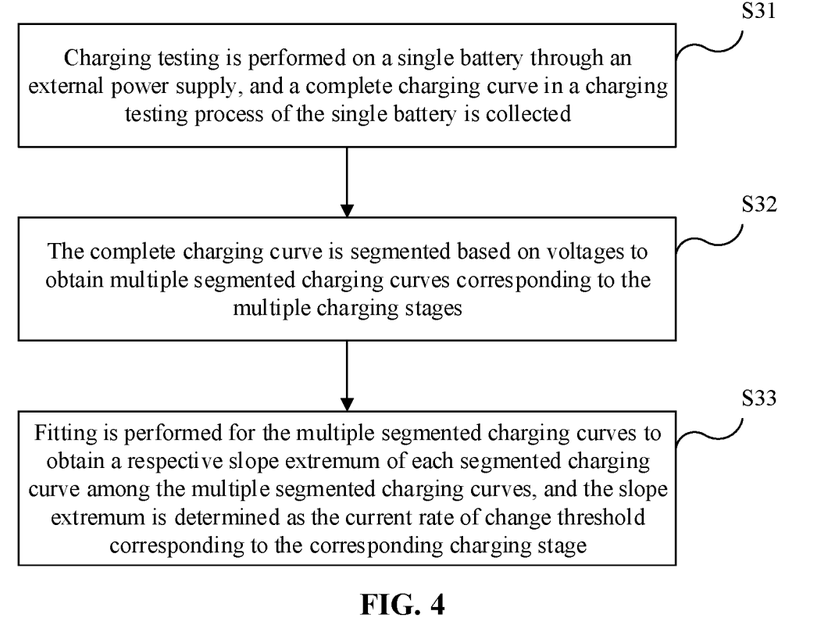
FIG. 4 is a flowchart of determining a current rate of change threshold according to an example of the present disclosure.

FIG. 4 is a flowchart of determining a current rate of change threshold according to an example of the present disclosure. Referring to FIG. 4, determination of the current rate of change threshold in the present disclosure includes the following operations.

In S31, a charging testing is performed on a single battery through an external power supply, and a corresponding complete charging curve in the charging testing process of the single battery is collected.

In the example of the present disclosure, charging testing is performed on the single battery through the external power supply, and the corresponding complete charging curve in the charging testing process of the single battery is collected. For example, the external power supply may be an external programmable power supply.

The external power supply is used instead of control software and charging device for controlling and adjusting a charging current and voltage in a mobile terminal, so that freer adjustment and control and more accurate setting are ensured. For example, charging testing may be performed on the single battery in different environments, for example, under different temperatures or different humidities.

In S32, the complete charging curve is segmented based on voltages to obtain multiple segmented charging curves corresponding to the multiple charging stages.

In the example of the present disclosure, a respective charging curve corresponding to each charging stage, for example, the current slash change region in FIG. 3, may be determined according to the complete charging curve collected by power charging test.

In the example of the present disclosure, the UI complete charging curve may be segmented based on voltages. For example:

the first segment is Vcell=8.45V interval, and the slope function is $a1*X^2+b1*X+c1$;

the second segment is Vcell=8.7V interval, and the slope function is $a2*X^2+b2*X+c2$; and the third segment is Vcell=8.96V interval, and the slope function is $a3*X^2+b3*X+c3$.

In S33, fitting is performed for the multiple segmented charging curves to obtain a respective slope extremum of each segmented charging curve among the multiple segmented charging curves, and the slope extremum is determined as the current rate of change threshold corresponding to the corresponding charging stage.

In the example of the present disclosure, for each segmented charging curve, polynomial fitting is performed according to measured curve scanning points, and then a first derivative is calculated. For example, a fitting result of the segmented charging curve is $a*X^2+b*X+c$, and a first derivative thereof is $2a*X+b$. Since a and b are known, a maximum value of the first derivative may be calculated, and X may further be calculated. In such a manner, the slope extremum K of the charging stage (CV interval) corresponding to the segmented curve may be calculated.

In the present disclosure, for the same battery, complete charging curves obtained in different charging environments are different, and correspondingly calculated current rate of change thresholds corresponding to each charging stage are also different. In the example of the present disclosure, charging testing may be performed on the single battery in different environments through the external power supply to obtain different complete charging curves, and different slope extremums may be calculated according to the different complete charging curves. Multiple slope extremums are compared, and the maximum slope extremum may be selected as the current rate of change threshold corresponding to each charging stage.

Figure 5:
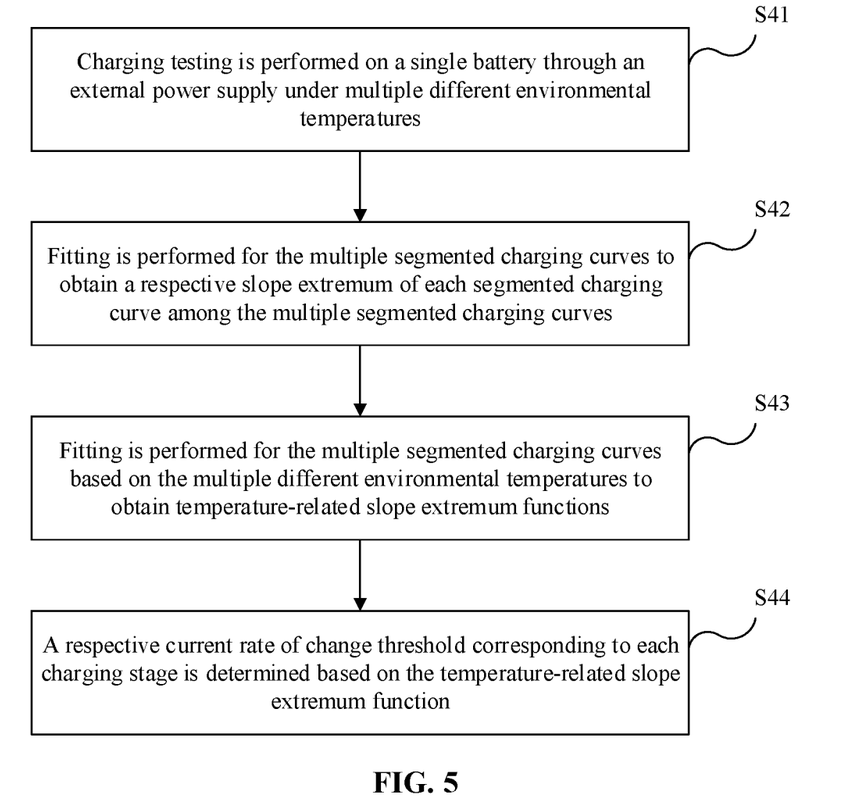
FIG. 5 is a flowchart of determining a current rate of change threshold according to an example of the present disclosure.

FIG. 5 is a flowchart of determining a current rate of change threshold according to another example of the present disclosure. Referring to FIG. 5, determination of the current rate of change threshold in the present disclosure includes the following operations.

In S41, charging testing is performed on a single battery through an external power supply under multiple different environmental temperatures.

In the example of the present disclosure, charging testing may be performed on the single battery through the external power supply under different environmental temperatures to obtain different complete charging curves.

In S42, fitting is performed for the multiple segmented charging curves to obtain a respective slope extremum of each segmented charging curve among the multiple segmented charging curves.

In S43, fitting is performed for the multiple segmented charging curves based on the multiple different environmental temperatures to obtain temperature-related slope extremum functions.

In the example of the present disclosure, complete charging curves obtained under different environmental temperatures are different, slope extremums of each segmented charging curve under different environmental temperatures may be calculated according to the different complete charging curves, and the slope extremums are temperature-related slope extremum functions.

In S44, a respective current rate of change threshold corresponding to each charging stage is determined based on the temperature-related slope extremum functions.

In the example of the present disclosure, temperature-related slope extremum functions under different environmental temperatures are different, and correspondingly, current rate of change thresholds under the different environmental temperatures are also different.

Figure 6:
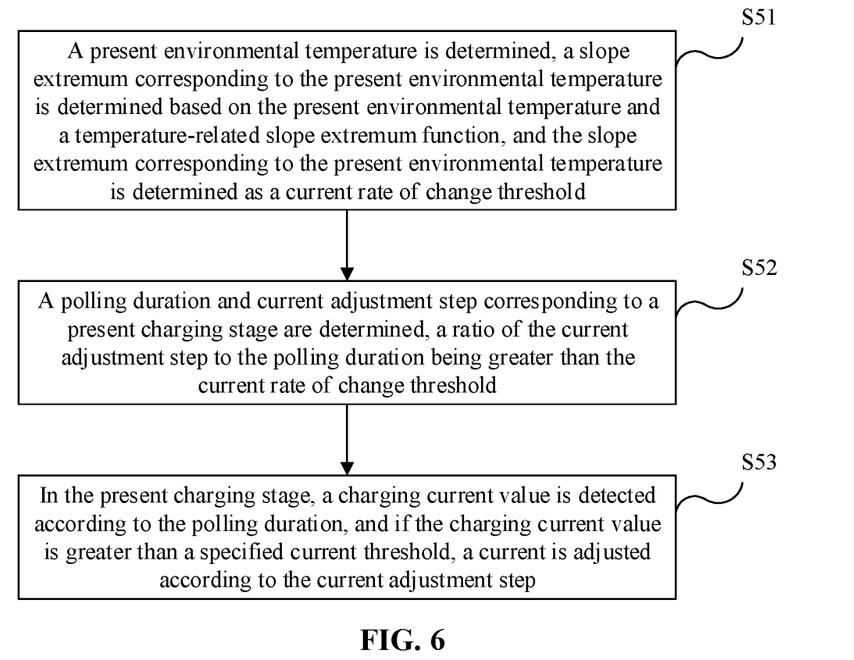
FIG. 6 is a flowchart of a charging control method according to an example of the present disclosure.

FIG. 6 is a flowchart of a charging control method according to another example of the present disclosure. Referring to FIG. 6, the charging control method of the present disclosure includes the following operations.

In S51, a present environmental temperature is determined, a slope extremum corresponding to the present environmental temperature is determined based on the present environmental temperature and a temperature-related slope extremum function, and the slope extremum corresponding to the present environmental temperature is determined as a current rate of change threshold.

In S52, a polling duration and current adjustment step corresponding to a present charging stage are determined, a ratio of the current adjustment step to the polling duration being greater than the current rate of change threshold.

In S53, in the present charging stage, a charging current value is detected according to the polling duration, and if the charging current value is greater than a specified current threshold, a current is adjusted according to the current adjustment step.

In the example of the present disclosure, that the ratio of the current adjustment step to the polling duration is greater than the current rate of change threshold in a charging process of a battery under different environmental temperatures may be correspondingly set to be different according to different current rate of change thresholds obtained under different environmental temperatures.

In the example of the present disclosure, temperature-related slope extremum functions obtained under different environmental temperatures are different, corresponding slope extremums are different, and current rate of change thresholds are also different. According to the charging control method of the present disclosure, the present environmental temperature is determined at first, then the temperature-related slope extremum function, the slope extremum and the current rate of change threshold are sequentially determined, and the finally obtained current rate of change threshold is a current rate of change threshold related to the present environmental temperature.

In the example of the present disclosure, the current rate of change threshold related to the present environmental temperature is determined as a basis for adjusting the ratio of the current adjustment step to the polling duration, so that the finally determined polling duration and current adjustment step corresponding to the present charging stage are also related to the present environmental temperature.

In the example of the present disclosure, the specified current threshold obtained according to the polling duration and current adjustment step related to the present environmental temperature is also related to the present environmental temperature. The current may be adjusted by the adjustment step related to the present environmental temperature according to the specified current threshold related to the environmental temperature. That is, according to the charging control method, the charging current may be adjusted by different current adjustment steps under different environmental temperatures.

For example, if the temperature is higher, internal resistance of the battery is higher, the current rate of change threshold during charging stage switching in the charging process of the battery is greater, and the charging current is adjusted more. By such a setting, when the battery is charged under different environmental temperatures, the charging current may be adjusted correspondingly according to different temperatures, so that the charging process of the battery may be controlled more accurately under different environmental temperatures, and in a process of maintaining CV charging of the battery, a charging overvoltage may be avoided on one hand, and on the other hand, the charging voltage may be kept approximate to the threshold as much as possible to ensure the charging efficiency.

In the example of the present disclosure, after the current rate of change threshold is determined, determination of the polling duration and current adjustment step corresponding to the present charging stage based on the current rate of change threshold may be implemented based on a minimum polling duration and a minimum current adjustment step. The minimum polling duration and the minimum current adjustment step may be determined based on an attribute of the battery.

In an implementation, the minimum polling duration and the minimum current adjustment step are determined. A polling duration adjustment parameter and a current adjustment parameter are determined based on the current rate of change threshold. A product of a value of the polling duration parameter and the minimum polling duration is the polling duration, and a product of a value of the current adjustment parameter and the minimum current adjustment step is the current adjustment step.

In an example, after the slope extremum K (the unit is mA/s) is calculated, a step $\Delta I$ and polling duration $\Delta t$ of the software loop are calculated based on a 2:1 Charge Pump of the whole machine. A minimum step of $\Delta t$ is dt=0.2 s, and a minimum step of $\Delta I$ is dI=50 mA. $\Delta I/\Delta t=(N1*dI)/(N2*dt)>K$ is made true, N1 and N2 being control parameters in the CV stage for step charge.

Based on the same concept, the examples of the present disclosure also provide a charging control device.

It can be understood that, for realizing the abovementioned functions, the charging control device provided in the examples of the present disclosure includes hardware structures and/or software modules corresponding to the functions. In combination with units and algorithm steps of each example disclosed in the examples of the present disclosure, the examples of the present disclosure may be implemented by hardware or a combination of the hardware and computer software. Whether a certain function is implemented in the form of hardware or in the form of computer software driving hardware depends on the specific applications and design constraint conditions of the technical solutions. Those skilled in the art may implement the described functions by using different methods for each specific application, but this implementation should not be considered beyond the scope of the present disclosure.

Figure 7:
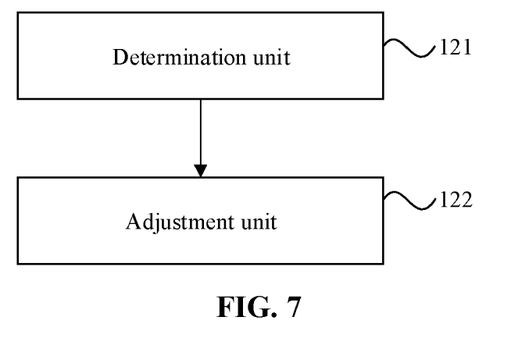
FIG. 7 is a block diagram of a charging control device according to an example of the present disclosure.

FIG. 7 is a block diagram of a charging control device according to an example of the present disclosure. Referring to FIG. 7, the device includes a determination unit 121 and an adjustment unit 122.

The determination unit 121 is configured to, for each charging stage in multiple charging stages, determine a current rate of change threshold corresponding to a present charging stage and determine a polling duration and current adjustment step corresponding to the present charging stage, a ratio of the current adjustment step to the polling duration being greater than the current rate of change threshold.

The adjustment unit 122 is configured to, in the present charging stage, detect a charging current value according to the polling duration, and if the charging current value is greater than a specified current threshold, adjust a current according to the current adjustment step.

In an example, the determination unit 121 is further configured to determine a respective current rate of change threshold corresponding to each charging stage among multiple charging stages based on charging curves corresponding to the multiple charging stages in a charging process of a single battery.

In an example, the determination unit 121 determines the respective current rate of change threshold corresponding to each charging stage among the multiple charging stages based on the charging curves corresponding to the multiple charging stages in the charging process of the single battery in the following manner of: performing a charging testing on the single battery through an external power supply, and collecting a corresponding complete charging curve in a charging testing process of the single battery; segmenting the complete charging curve based on voltages to obtain multiple segmented charging curves corresponding to the multiple charging stages; and performing fitting the multiple segmented charging curves to obtain a respective slope extremum of each segmented charging curve among the multiple segmented charging curves, and determining the slope extremum as the current rate of change threshold corresponding to the corresponding charging stage.

In an example, the determination unit 121 performs the charging testing on the single battery through the external power supply in the following manner of: performing the charging testing on the single battery through the external power supply based on multiple different environmental temperatures; and the operation that fitting is performed for the multiple segmented charging curves to obtain the respective slope extremum of each segmented charging curve among the multiple segmented charging curves includes that: fitting is performed for the multiple segmented charging curves based on the multiple different environmental temperatures to obtain temperature-related slope extremum functions.

In an example, the determination unit 121 determines the current rate of change threshold corresponding to the present charging stage in the following manner of: determining a present environmental temperature, determining a slope extremum corresponding to the present environmental temperature based on the present environmental temperature and the temperature-related slope extremum functions, and determining the slope extremum corresponding to the present environmental temperature as the current rate of change threshold.

In an example, the operation that the polling duration and current adjustment step corresponding to the present charging stage are determined includes that: a minimum polling duration and a minimum current adjustment step are determined; and a polling duration adjustment parameter and a current adjustment parameter are determined based on the current rate of change threshold, a product of a value of the polling duration parameter and the minimum polling duration being the polling duration and a product of a value of the current adjustment parameter and the minimum current adjustment step being the current adjustment step.

With respect to the device in the above examples, the specific manner for the operation executed by each module has been described in detail in the examples related to the method, and is not elaborated herein.

Figure 8:
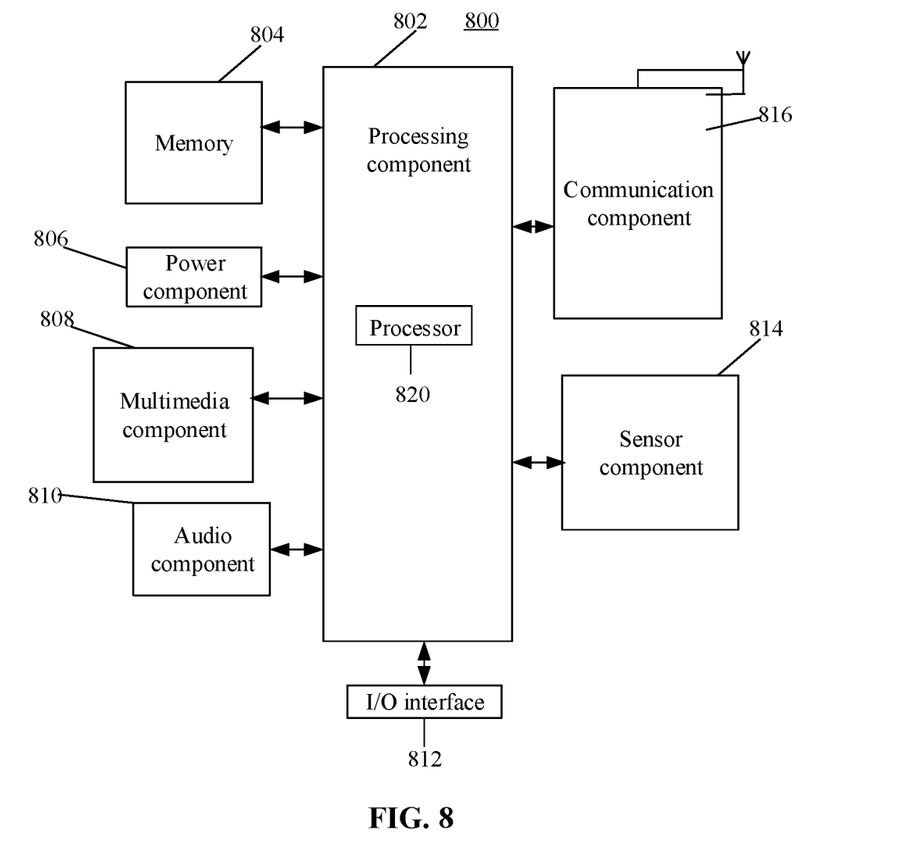
FIG. 8 is a block diagram of a device according to an example of the present disclosure.

FIG. 8 is a block diagram of a device 800 for gain-switching-based data collection according to an example of the present disclosure. For example, the device 800 for gain-switching-based data collection may be a mobile phone, a computer, a digital broadcast terminal, a messaging device, a gaming console, a tablet, a medical device, exercise equipment, a personal digital assistant and the like.

Referring to FIG. 8, the device 800 for gain-switching-based data collection may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800 for gain-switching-based data collection, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800 for gain-switching-based data collection. Examples of such data include instructions for any applications or methods operated on the cellular network signal measurement device 800 for gain-switching-based data collection, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for each component of the device 800 for gain-switching-based data collection. The power component 806 may include a power management system, one or more power supplies, and other components associated with generation, management and distribution of power for the device 800 for gain-switching-based data collection.

The multimedia component 808 includes a screen providing an output interface between the device 800 for gain-switching-based data collection and a user. In some examples, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some examples, the multimedia component 808 includes a front camera and/or a rear camera. The front camera and/or the rear camera may receive external multimedia data when the device 800 for gain-switching-based data collection is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 for gain-switching-based data collection is in the operation mode, such as a call mode, a recording mode and a voice recognition mode. The received audio signal may further be stored in the memory 804 or sent through the communication component 816. In some examples, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800 for gain-switching-based data collection. For example, the sensor component 814 may detect an open/closed status of the device 800 for gain-switching-based data collection and relative positioning of components, e.g., the display and the keypad, of the device 800 for gain-switching-based data collection. The sensor component 814 may also detect a change in position of the device 800 for take-off capturing or a component of the device 800 for take-off capturing, a presence or absence of a user contact with the device 800 for gain-switching-based data collection, an orientation or acceleration/deceleration of the device 800 for gain-switching-based data collection and a change in temperature of the device 800 for gain-switching-based data collection. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the device 800 for gain-switching-based data collection and another device. The device 800 for gain-switching-based data collection may access a communication-standard-based wireless network, such as a Wireless Fidelity (WiFi) network, a 2nd-Generation (2G) or 3rd-Generation (3G) network or a combination thereof. In an example of the present disclosure, the communication component 816 receives a broadcast signal or broadcast associated information from an external broadcast management system through a broadcast channel. In an example, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Bluetooth (BT) technology and another technology.

In an example, the device 800 for gain-switching-based data collection may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an example, there is also provided anon-transitory computer-readable storage medium including an instruction, such as the memory 804 including an instruction, and the instruction may be executed by the processor 820 of the device 800 for gain-switching-based data collection to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an aspect of the present disclosure, a charging control device is provided, which is applied to a battery charging process including multiple charging stages, the device including: a determination unit, configured to, for each charging stage among the multiple charging stages, determine a current rate of change threshold corresponding to a present charging stage and determine a polling duration and current adjustment step corresponding to the present charging stage, a ratio of the current adjustment step to the polling duration being greater than the current rate of change threshold; and an adjustment unit, configured to, in the present charging stage, detect a charging current value according to the polling duration, and if the charging current value is greater than a specified current threshold, adjust a current according to the current adjustment step.

It can be understood that, in the present disclosure, "multiple" refers to two or more than two and the same is true for other quantifiers. The "and/or" is an association relationship for describing associated objects and represents that three relationships may exist. For example, A and/or B may represent the following three cases: only A exists, both A and B exist, and only B exists. The character "/" generally indicates that the related objects are in an "or" relationship. "A/an", "said" and "the" in a singular form are also intended to include a plural form, unless other meanings are clearly denoted throughout the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Furthermore, it can be understood that terms "first", "second" and the like are adopted to describe various information but the information is not limited to these terms. These terms are only adopted to distinguish information of the same type and do not represent a specific sequence or importance. Practically, expressions such as "first" and "second" are exactly interchangeable. For example, without departing from the scope of the present disclosure, first information may also be called second information and, similarly, second information may also be called first information.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Furthermore, it can be understood that, in the examples of the present disclosure, although the operations are executed in specific sequences in the accompanying drawings, it should not be understood that these operations are required to be executed according to the shown specific sequences or in series or all the shown operations are required to be executed to obtain expected results. In a specific environment, multiple tasks and parallel processing may be favorable.

Other examples of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A charging control method, comprising:
for each charging stage among a plurality of charging stages, determining an electric current rate of change threshold corresponding to the charging stage serving as a present charging stage, wherein the charging control method is applied to a battery charging process comprising the plurality of charging stages; and
in the present charging stage, detecting a charging current value, and in response to determining that the charging current value is greater than a specified current threshold, adjusting the charging current value based on the electric current rate of change threshold,
wherein for each charging stage among the plurality of charging stages, determining the electric current rate of change threshold corresponding to the charging stage serving as the present charging stage comprises:

determining, based on charging curves corresponding to the plurality of charging stages in the battery charging process of a single battery, the respective electric current rate of change threshold corresponding to each charging stage among the plurality of charging stages, wherein determining, based on the charging curves corresponding to the plurality of charging stages in the battery charging process of the single battery, the respective electric current rate of change threshold corresponding to each charging stage among the plurality of charging stages comprises:

performing a charging testing on the single battery through an external power supply, and collecting a corresponding complete charging curve in the charging testing process of the single battery;

segmenting the complete charging curve based on voltages to obtain a plurality of segmented charging curves corresponding to the plurality of charging stages; and performing fitting for the plurality of segmented charging curves to obtain a respective slope extremum of each segmented charging curve among the plurality of segmented charging curves, and determining the slope extremum as the electric current rate of change threshold corresponding to the corresponding charging stage.

2. The charging control method of claim 1, wherein performing the charging testing on the single battery through the external power supply comprises:

performing the charging testing on the single battery through the external power supply based on a plurality of different environmental temperatures; and wherein performing fitting for the plurality of segmented charging curves to obtain the respective slope extremum of each segmented charging curve among the plurality of segmented charging curves comprises:

performing fitting for the plurality of segmented charging curves based on the plurality of different environmental temperatures to obtain temperature-related slope extremum functions.

3. The charging control method of claim 2, wherein determining the electric current rate of change threshold corresponding to the present charging stage further comprises:

determining a present environmental temperature;

determining a slope extremum corresponding to the present environmental temperature based on the present environmental temperature and the temperature-related slope extremum functions; and determining the slope extremum corresponding to the present environmental temperature as the electric current rate of change threshold.

4. A charging control device, comprising:

a processor; and a memory configured to store instructions executable by the processor, wherein the processor is configured to:

for each charging stage among a plurality of charging stages, determine an electric current rate of change threshold corresponding to the charging stage serving as a present charging stage, wherein the plurality of charging stages is comprised in a battery charging process; and in the present charging stage, detect a charging current value, and in response to determining that the charging current value is greater than a specified current threshold, adjust the charging current value based on the electric current rate of change threshold, wherein the processor is further configured to:

determine, based on charging curves corresponding to the plurality of charging stages in the battery charging process of a single battery, the respective electric current rate of change threshold corresponding to each charging stage among the plurality of charging stages, wherein the processor is further configured to:

perform a charging testing on the single battery through an external power supply, and collect a corresponding complete charging curve in the charging testing process of the single battery;

segment the complete charging curve based on voltages to obtain a plurality of segmented charging curves corresponding to the plurality of charging stages; and perform fitting for the plurality of segmented charging curves to obtain a respective slope extremum of each segmented charging curve among the plurality of segmented charging curves, and determine the slope extremum as the electric current rate of change threshold corresponding to the corresponding charging stage.

5. The charging control device of claim 4, wherein the processor is further configured to:

perform the charging testing on the single battery through the external power supply based on a plurality of different environmental temperatures; and perform fitting for the plurality of segmented charging curves based on the plurality of different environmental temperatures to obtain temperature-related slope extremum functions.

6. The charging control device of claim 5, wherein the processor is further configured to:

determine a present environmental temperature;

determine a slope extremum corresponding to the present environmental temperature based on the present environmental temperature and the temperature-related slope extremum functions; and determine the slope extremum corresponding to the present environmental temperature as the electric current rate of change threshold.

7. A non-transitory computer-readable storage medium having stored therein instructions that, when executed by a processor of a mobile terminal, cause the mobile terminal to perform operations comprising:

for each charging stage among a plurality of charging stages, determining an electric current rate of change threshold corresponding to the charging stage serving as a present charging stage, wherein the plurality of charging stages is comprised in a battery charging process; and in the present charging stage, detecting a charging current value, and in response to determining that the charging current value is greater than a specified current threshold, adjusting the charging current value based on the electric current rate of change threshold, wherein the instructions, when executed by the processor of the mobile terminal, cause the mobile terminal to further perform operations comprising:

determining, based on charging curves corresponding to the plurality of charging stages in the battery charging process of a single battery, the respective electric current rate of change threshold corresponding to each charging stage among the plurality of charging stages, wherein determining, based on the charging curves corresponding to the plurality of charging stages in the battery charging process of the single battery, the respective electric current rate of change threshold corresponding to each charging stage among the plurality of charging stages comprises:

performing a charging testing on the single battery through an external power supply, and collecting a corresponding complete charging curve in the charging testing process of the single battery;

segmenting the complete charging curve based on voltages to obtain a plurality of segmented charging curves corresponding to the plurality of charging stages; and performing fitting for the plurality of segmented charging curves to obtain a respective slope extremum of each segmented charging curve among the plurality of segmented charging curves, and determining the slope extremum as the electric current rate of change threshold corresponding to the corresponding charging stage.

8. The non-transitory computer-readable storage medium of claim 7, wherein performing the charging testing on the single battery through the external power supply comprises:

performing the charging testing on the single battery through the external power supply based on a plurality of different environmental temperatures; and wherein performing fitting for the plurality of segmented charging curves to obtain the respective slope extremum of each segmented charging curve among the plurality of segmented charging curves comprises:

performing fitting for the plurality of segmented charging curves based on the plurality of different environmental temperatures to obtain temperature-related slope extremum functions.

9. The non-transitory computer-readable storage medium of claim 8, wherein determining the electric current rate of change threshold corresponding to the present charging stage comprises:

determining a present environmental temperature;

determining a slope extremum corresponding to the present environmental temperature based on the present environmental temperature and the temperature-related slope extremum functions; and determining the slope extremum corresponding to the present environmental temperature as the electric current rate of change threshold.

* * * * *